United States Patent [19]
Hellbrugge

[11] Patent Number: 5,750,067
[45] Date of Patent: May 12, 1998

[54] METHOD FOR BLOW MOLDING HOLLOW ARTICLE WITH ANNULAR CHIME AND DEEPLY RECESSED ENDS

[76] Inventor: Luiz Henrique Hellbrugge, 3886 Sheldrake Ave., Okemos, Mich. 48864

[21] Appl. No.: 729,694

[22] Filed: Oct. 7, 1996

[51] Int. Cl.[6] ................ B29C 49/04; B29C 49/20
[52] U.S. Cl. .................. 264/515; 264/516; 264/534; 425/503; 425/525
[58] Field of Search .................. 264/534, 515, 264/516; 425/525, 503

[56] References Cited

U.S. PATENT DOCUMENTS

| | | | |
|---|---|---|---|
| 3,960,474 | 6/1976 | Kader | 425/525 |
| 4,170,623 | 10/1979 | Dubois et al. | 264/534 |
| 4,215,089 | 7/1980 | Uhlig et al. | 264/516 |
| 4,228,122 | 10/1980 | Hammes | 264/534 |
| 4,264,016 | 4/1981 | Speas | 220/646 |
| 4,266,927 | 5/1981 | Gilbert et al. | 264/534 |
| 4,378,328 | 3/1983 | Przytulla et al. | 264/534 |
| 5,213,753 | 5/1993 | Przytulla | 264/534 |
| 5,543,107 | 8/1996 | Malik | 264/534 |

Primary Examiner—Catherine Timm

[57] ABSTRACT

A method and apparatus for blow molding articles having a circumferential sidewall terminating in a closed top in which at least one preformed solid hoop is partially fused to the circumferential wall of the article and projecting axially above at least a portion of said top end. The entire outer peripheral edge portion of each reinforcing hoop is concentrically placed underneath the extrusion head with a suitable fitting. Thereafter, a tube of soft thermoplastic material is extruded through the totally open central portion of the hoops until the end of the tube overlies the pneumatic nozzles. Each mold half consists of a center sections and intermediate sections that are relatively movable in a direction lengthwise of the mold to enable both engaging the hoops and loosening the blow molded article of the mold. End mold sections slide on an incline to fully close the mold. The semi-cylindrical mold central halves close to radially position the hoops and form a cylindrical mold. The intermediate mold sections move in a tandem slide toward the central mold halves to engage the hoops. The mold end sections fully close the mold and thereafter the thermoplastic tube is blown against the walls of the mold and the reinforcing hoops and fitting therefor to form the container with reinforcing hoops bonded to top and bottom of the container. Reverse mold opening sequence allows article demolding. The so made resulting article has chimes extended axially beyond the end of the article and deeply recessed top and bottom.

6 Claims, 10 Drawing Sheets

METHOD FOR BLOW MOLDING HOLLOW ARTICLE WITH ANNULAR CHIME AND DEEPLY RECESSED ENDS

BACKGROUND OF THE INVENTION

1. Field of the Invention

This invention relates generally to the field of blow molding and more particularly to an improved method and apparatus for blow molding articles having a full ring-shaped reinforcing member fused to a periphery thereof, where the members extend axially beyond the end of the article.

The reinforcing hoops are used in close hollow bodies, for example bunged vessels, as roll hoops or transport rings. It is desirable to provide articles with preformed solid hoop fused to the circumferential wall of the article and projecting axially above at least a portion of the top end to promote protection of the bung openings and improved mechanical properties.

In the blow molding art, techniques are known for blow molding containers having inserted parts bonded thereto. Prior techniques for blow molding containers with reinforcing hoops (or other relatively large circumferential elements) bonded thereto, where the hoops extend axially beyond the end of the container, required the provision of solid mold filler inserts, which are at least as deep axially as the height that said reinforcing hoop projects beyond the end of said container to be formed.

2. Description of the Prior Art

It is known in the blow molding art to reinforce the periphery of the blow molded article by the following process: (a) placing a reinforcing ring or hoop in a suitable fitting so that the hoop lies beneath an extrusion head; (b) extruding a tube of soft thermoplastic material through the open central portion of the hoop; (c) closing two semi-cylindrical halves of a cylindrical mold to engage the hoop; and thereafter (d) blowing the thermoplastic tube into engagement with the walls of the mold and a circumferential portion of the hoop.

Techniques are also known in the blow molding art for molding hoops around the end of a drum, during blow molding thereof. The method involves (a) placing a hoop in one-half of the blow mold in a peripheral groove in the inner wall thereof, so that a semi-circle of the hoop protrudes horizontally from the mold half, (b) moving the mold to partially closed position until the semi-circle of the hoop underlies an extruded parison, (c) advancing the parison through the hoop and between the mold halves, (d) closing the semi-cylindrical mold halves, (e) closing semi-circular end plates of the mold halves by moving the plates toward said hoops and engaging same, (f) blowing the parison to form the article, and cooling the article, (g) moving said end plates axially away from the article, and (h) opening the mold halves and removing the molded article.

Prior to the advent of the present invention, no feasible technique has been known for efficiently and effectively blow molding synthetic plastic containers, having closed ends, where the hoops extend axially beyond the end of the plastic container resulting in deeply recessed top and bottom of the container. The techniques described above in connection with placing upper reinforcing hoop or lower reinforcing hoop on a container during blow molding process do not disclose means to open the mold for articles with deeply recessed top and bottom without deforming container openings, pinch-off seam and respective top and bottom article surfaces.

SUMMARY OF THE INVENTION

In view of the foregoing, it is an object of the present invention to provide an effective and efficient apparatus and process for molding hollow articles having integrally molded exterior peripheral annular members fused to a periphery thereof, where the members extend axially beyond the end of the article.

According to the present invention, reinforcing hoops or rings (preferably of hard plastic material) are coaxially placed underneath the extrusion head with a suitable fitting. When so placed the two spaced reinforcing rings are substantially parallel to one another and coaxially aligned with the extrusion head center line. Thereafter, a tube of soft thermoplastic material is extruded through the totally open central portion of the hoops until the end of the tube overlies the pneumatic nozzles. The method is suitable for both continuous and discontinuous extrusion blow molding process.

Each mold half consists of three sections: (1) a semi-cylindrical center section with semi-circular upper and lower groves, designed to accommodate the outer periphery of the reinforcing hoops; (2) intermediate sections that are relatively movable in a direction lengthwise of the mold to enable both engaging the hoops into said grooves on said center mold sections and releasing the deeply recessed top and bottom surfaces of the blown article from the mold; (3) end mold sections that are relatively movable in an incline enable both, fully closing the mold and releasing the pinched-off portion of thermoplastic material tube before opening of the mold.

The semi-cylindrical mold central halves close to radially position the hoops and form a cylindrical mold. The intermediate mold sections move in a tandem slide toward the central mold halves to engage the hoops. The mold end sections fully close the mold and thereafter the thermoplastic tube is blown against the walls of the mold and the reinforcing hoops, fitting therefor to form the container with reinforcing hoops bonded to top and bottom of the container. Thereafter the thermoplastic material is allowed to cool and harden. The mold end sections slide away from the mold cavity in an incline, releasing the pinched-off portion of the thermoplastic material tube. The intermediate mold sections axially move apart from the central mold sections, allowing the resulting product to be removed from the mold.

The so made resulting article has chimes extended axially beyond the end of the article and deeply recessed top and bottom.

The invention is not limited to rotationally symmetric hollow bodies, for example drums; but alternatively relates to parallelepiped hollow bodies such as, for example, canisters or bottle-like containers with, for example a rectangular or square cross section.

Other objects, features and aspects, as well as advantages of the present invention will become apparent from a study of the following descriptions and drawings.

The invention is also suitable for blow molded hollow bodies having compression blow molded peripheral annular members extending axially beyond the end of the article.

BRIEF DESCRIPTION OF THE DRAWINGS

FIGS. 1–10 will be more fully discussed hereafter.

DETAILED DESCRIPTION OF THE PREFERRED EMBODIMENTS OF THE INVENTION

Figure 1:
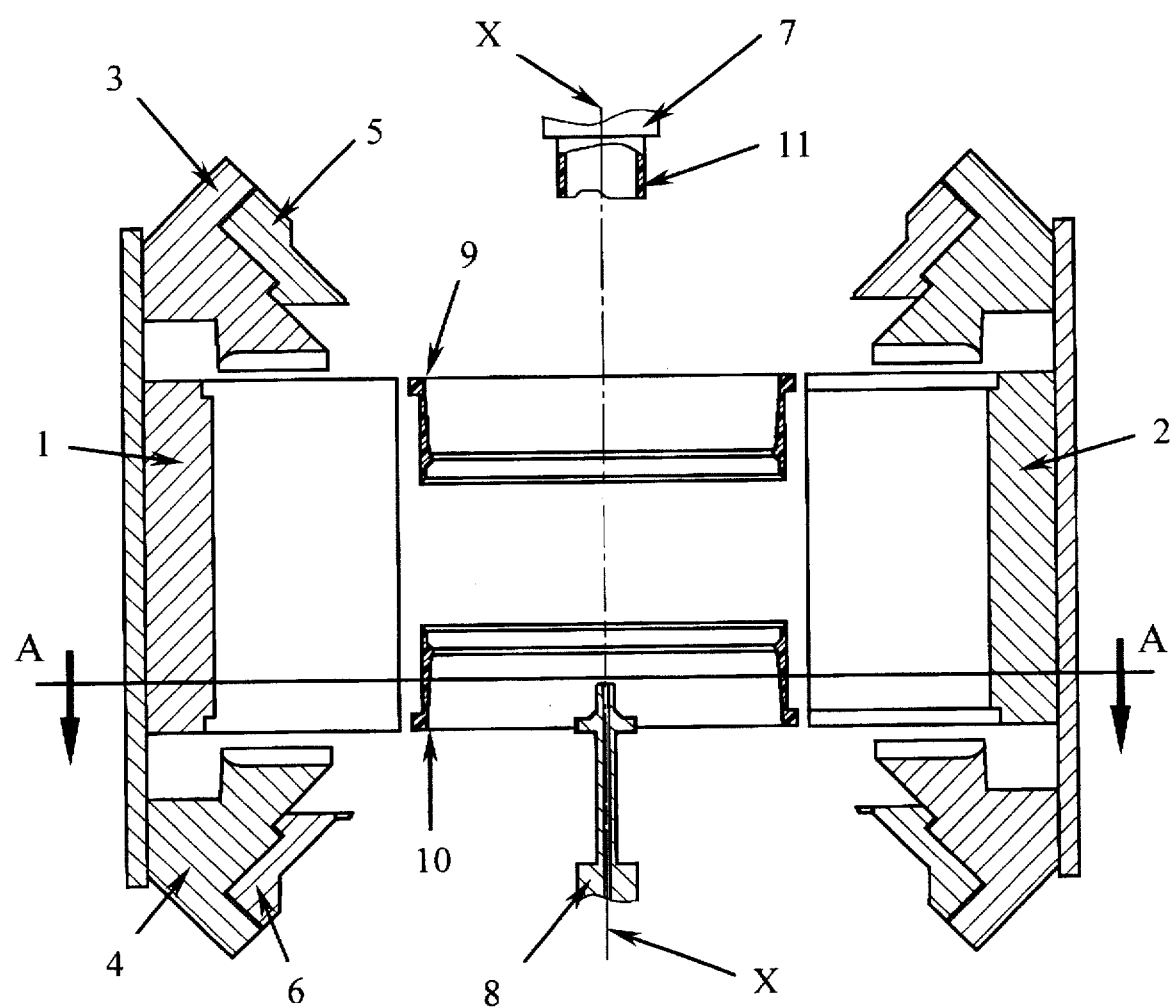
FIG. 1 is a cross-sectional view of the molding apparatus of the present invention showing the mold in a fully extended position with reinforcing hoops placed coaxially underneath the extrusion head.

Referring now to the drawings, the blow mold apparatus of the present invention comprises a generally cylindrical mold divided into generally semi-cylindrical left and right mold central halves 1 and 2 respectively. The mold apparatus further includes upper and lower intermediate mold sections 3 and 4, respectively. Each of the intermediate mold sections 3 and 4 is divided into generally semi-circular left and right halves.

The mold apparatus further includes upper and lower end mold sections 5 and 6, respectively. Each of the end mold sections 5 and 6 is divided into left and right halves. Intermediate mold sections 3 and 4 together with end mold sections 5 and 6 form top and bottom mold inner surfaces when in closed position.

Each of the mold central semi-cylindrical halves 1 and 2 has an upper semi-circular groove 12 near the upper end thereof, and a lower semi-circular groove 13 near the lower end thereof. As described in greater detail below, when the two semi-cylindrical central mold halves 1 and 2 are moved into engagement with one another (as shown in FIGS. 4–9), the two upper semi-circular grooves 12,12 align with one another to form an annular upper groove, and the two lower semi-circular grooves 13,13 align with one another to form an annular lower groove. These annular grooves receive and retain outwardly extending peripheral flanges of reinforcing hoops 9 and 10 which are bonded to the outer peripheries of the upper and lower ends of the blow molded article during the blow molding process.

Figure 7:
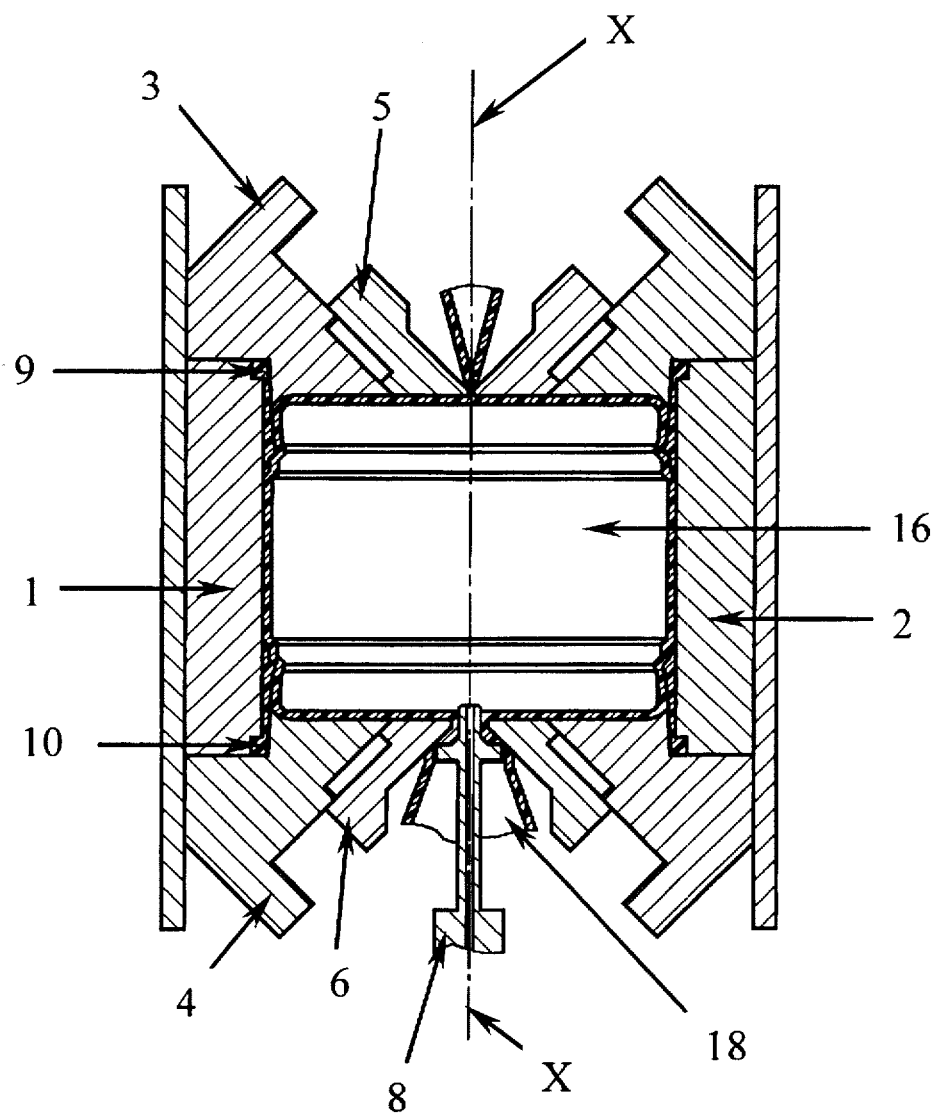
FIG. 7 is a cross-sectional view similar to FIGS. 1, 3–6, showing the apparatus of the present invention after the thermoplastic tube has been blown against the interior surfaces of the mold and the reinforcing hoops to form the container of the present invention.

Since, as shown in FIG. 7, the ring shaped members 9 and 10 respectively extend axially past the lowest and uppermost portion of the hollow article 16 (the drum or container 16 is in inverted position in FIGS. 7–10), generally semi-circular movable end mold sections slide on an incline apart from the mold cavity to release the pinched-off flashes and container openings so that the intermediate mold section halves can be extended after hoops become integrally bonded with the container wall without deforming container top and bottom.

Figure 2:
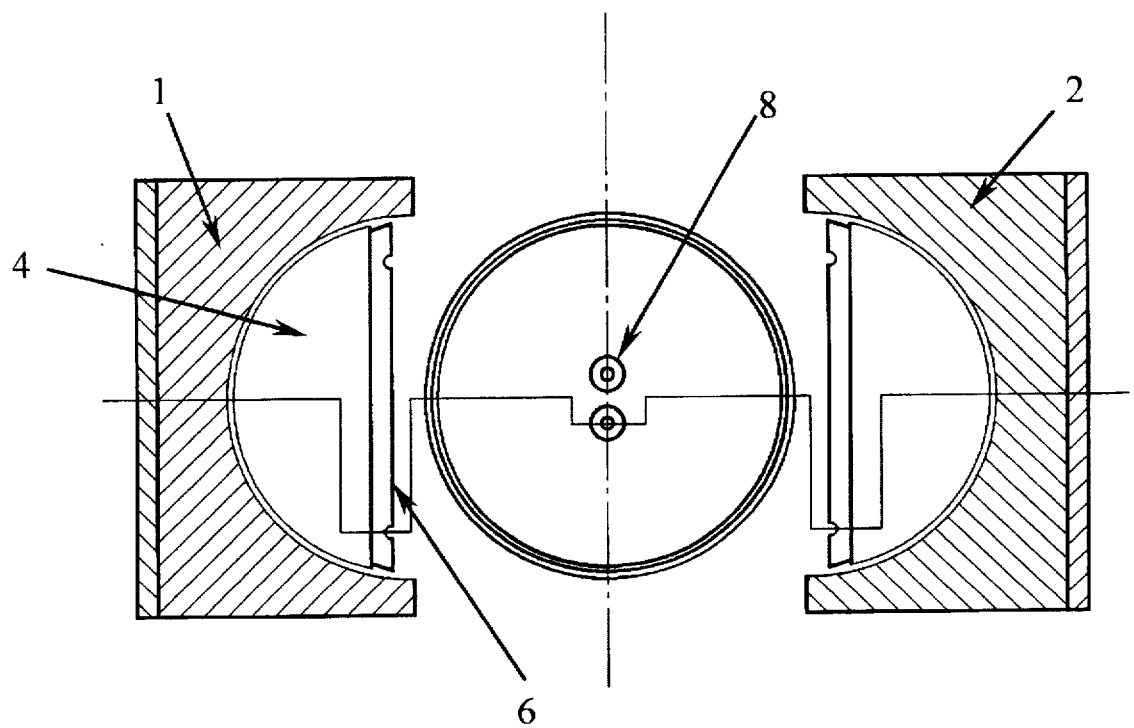
FIG. 2 is a top view of section A—A of FIG. 1.
Figure 3:
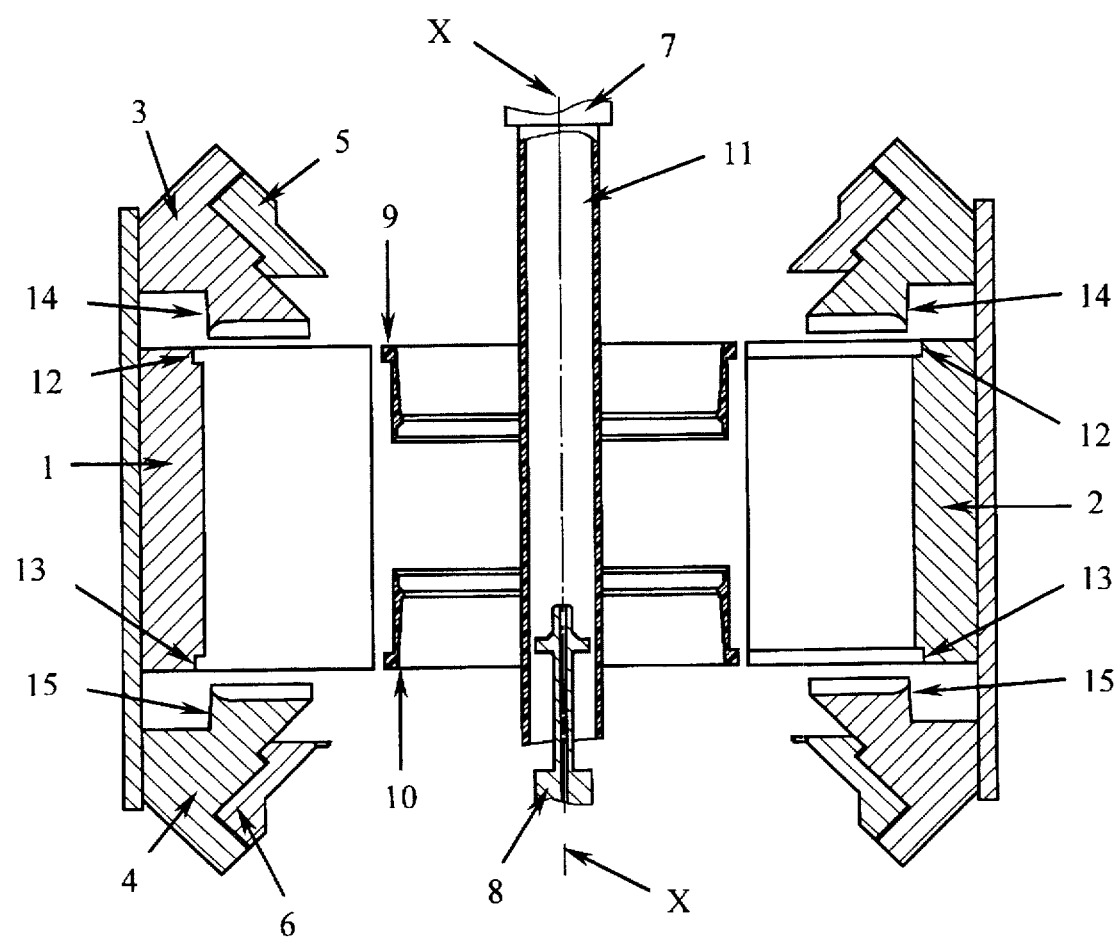
FIG. 3 is a cross-sectional view similar to FIG. 1, showing the molding apparatus with a tube of soft thermoplastic material extending downwardly through the reinforcing hoops and over the pneumatic nozzles.

The apparatus of the present invention is used in conjunction with an extruder, the outlet head 7 of which is shown in the drawings, and a pneumatic apparatus, the outlet nozzles 8 of which is shown in the drawings. As described more fully below, the extruder head 7 emits a tube 11 of relatively soft thermoplastic material (sometimes referred to as "parison"). As best shown in FIGS. 2 and 3, the pneumatic nozzles are aligned underneath the extruder head, parallel to a vertical axis X—X so that they will receive the lower end of the soft thermoplastic tube 11 emitted from the extruder head 7. An apparatus, not shown, spreads both nozzles apart into final position, coinciding with respective mold end sections openings, spreading the end of the parison in a parallel direction to mold bottom parting line, prior to mold closing.

Figure 4:
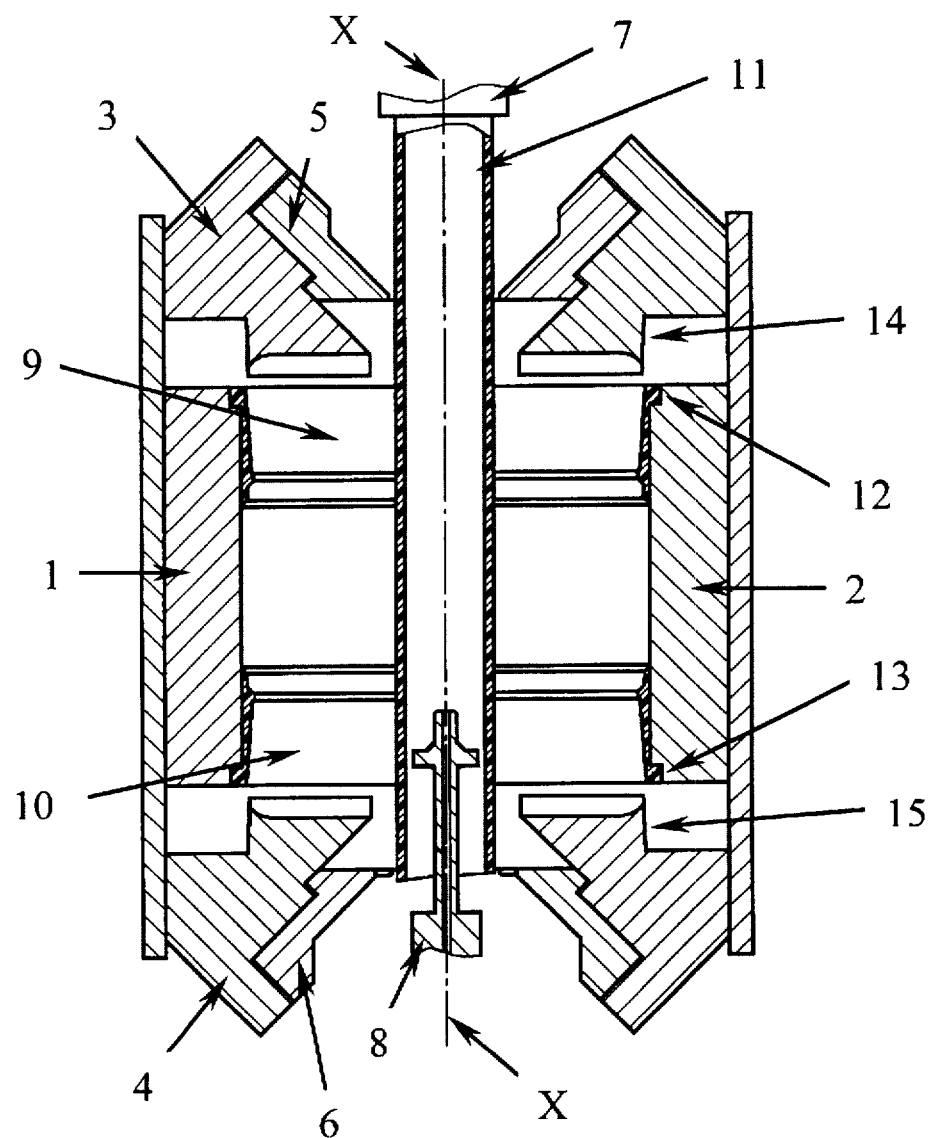
FIG. 4 is a cross-sectional view similar to FIGS. 1 and 3, showing the central mold sections in their closed position.

As shown by comparison of FIGS. 3 and 4 of the drawings, and described in greater detail below in connection with the improved process of the present invention, the semi-cylindrical mold central halves 1 and 2 are movable toward one another in a horizontal direction (i.e., perpendicular to axis X—X). FIG. 1 shows the mold halves 1 and 2 in their fully separated position, which permits the reinforcing hoops 9 and 10 to be positioned coaxially to extruder head centerline X—X and respectively horizontally aligned with upper and lower semi-circular grooves 12 and 13. A suitable fitting, not shown, keeps hoops 9 and 10 in their position, substantially parallel to one another, until mold semi-cylindrical central halves close. FIG. 3 shows the mold halves 1 and 2 in their fully separated position and reinforcing hoops 9 and 10 positioned, which permits the extruder head 7 to extrude or drop a tube 11 of soft thermoplastic material or parison through the completely open circular surface of reinforcing hoops 9 and 10. FIG. 4 shows the central mold halves 1 and 2 in their closed position wherein the two semi-circular grooves 12 and the two semi-circular grooves 13 connect with one another to form annular upper and lower grooves which receive and retain the reinforcing hoops 9 and 10 respectively.

Figure 5:
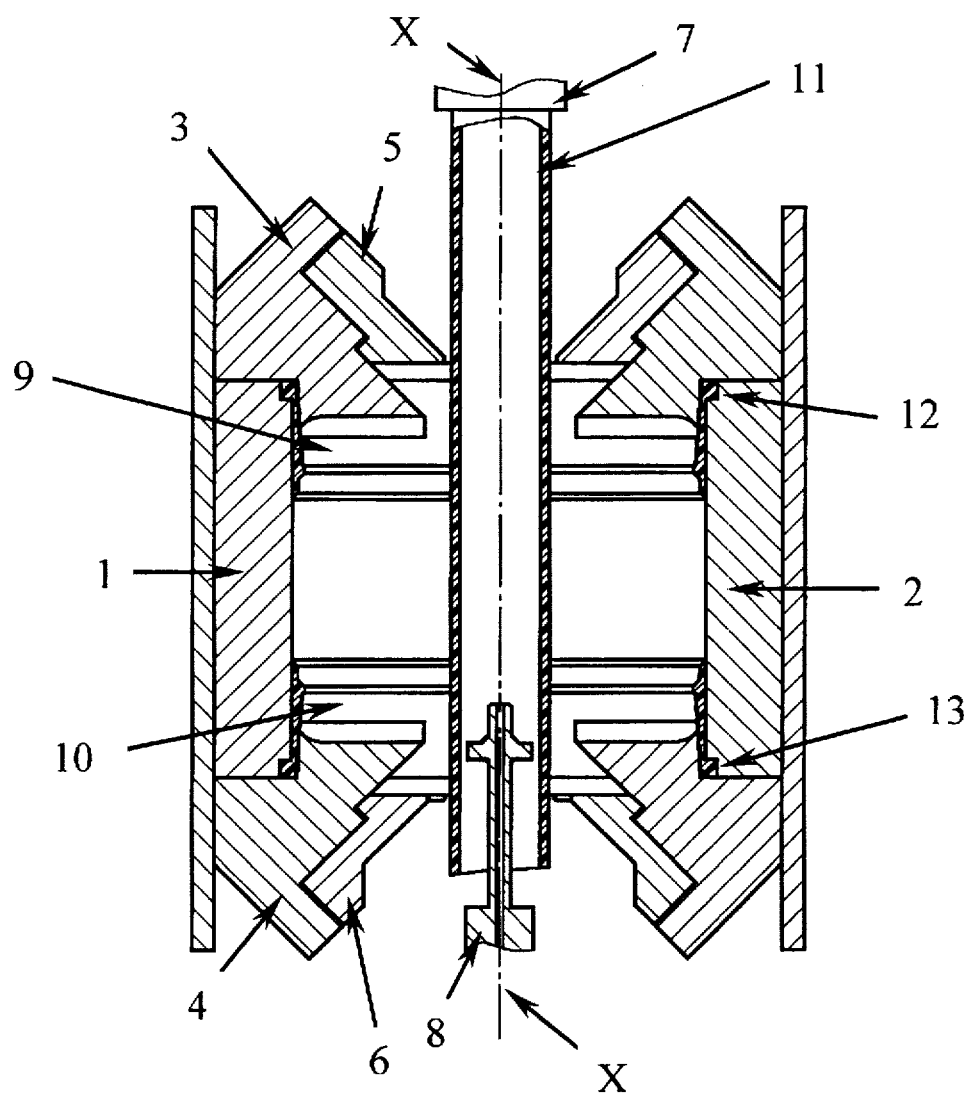
FIG. 5 is a cross-sectional view similar to FIGS. 1, 3 and 4, showing both central and intermediate mold sections in their closed positions.

As best shown by comparing FIGS. 4 and 5, the upper and lower intermediate mold sections 3 and 4 of the mold apparatus are adapted to be moved vertically towards mold central sections 1 and 2.

Figure 6:
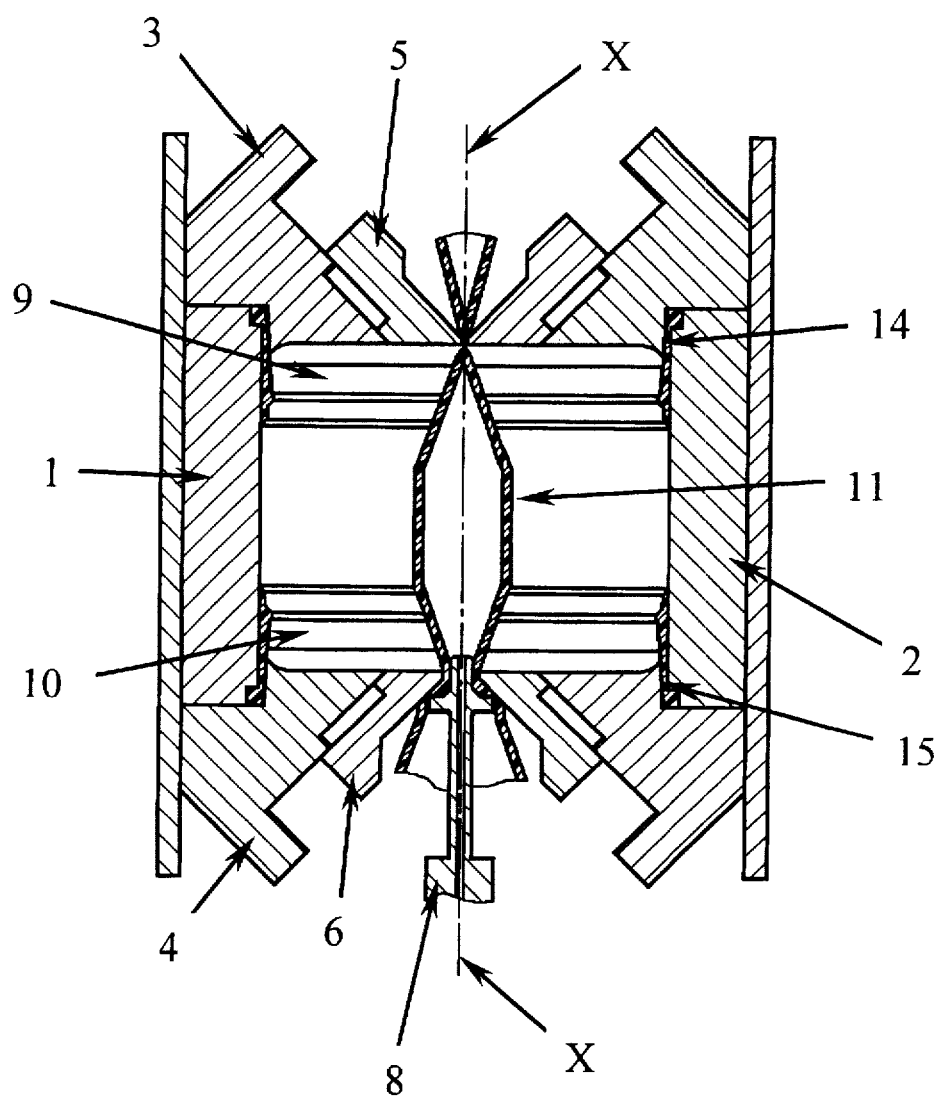
FIG. 6 is a cross-sectional view similar to FIGS. 1, 3, 4 and 5, showing all mold sections in their closed position, prior to gas being blown into the soft thermoplastic material tube.

As best shown by comparing FIGS. 5 and 6, the upper and lower end mold sections 5 and 6 of the mold apparatus are adapted to be moved in an inclined direction to axis X—X towards mold cavity.

The improved process of making an improved, reinforced plastic container according to the present invention will now be described.

As shown in FIG. 1, the upper and lower reinforcing hoops 9 and 10, are first coaxially placed underneath the extrusion head with a suitable fitting. When so positioned the reinforcing hoops 9 and 10 are substantially parallel to one another so as to form a fully open passage for the soft thermoplastic tube or parison 11. The extruder (not shown) is operated to extrude a soft thermoplastic tube 11 downwardly through the open hoops 9 and 10 until the lower portion of the tube 11 overlies the pneumatic nozzles 8. The mold central halves 1 and 2 are driven toward one another to their closed position shown in FIG. 4, retaining the reinforcing hoops 9 and 10 in the semi-circular grooves 12 and 13 respectively. With the central mold section halves 1 and 2 closed as shown in FIG. 5, the top and bottom intermediate mold sections 3 and 4 are moved towards one another (i.e. in a direction along the axis X—X) to closed position shown in FIG. 5, engaging reinforcing hoops 9 and 10. Thereafter, both halves of the top and bottom end mold sections 5 and 6 are moved on an incline towards the mold cavity, as shown in FIG. 6, whereby the halves of top end mold section 5 will pinch or press the upper portion of tube 11 closed, and the halves of bottom end mold section 6 will pinch or press the lower portion of tube 11 closed, against the nozzles 8. As shown in FIG. 6, the centerline of tube 11 substantially coincides with the vertical axis X—X and forms a closed, empty body. It will be noted that the inner surface formed by each of the intermediate and end mold sections 3, 4, 5 and 6 (i.e. the top and bottom surfaces facing the interior of the mold) when in closed position as shown in FIG. 6, are stepped to form cylindrical surfaces 14 and 15. The inner cylindrical surface 14 in the top mold sections 3 and 5 receive the inner portions of the upper reinforcing hoop 9; and the inner cylindrical surfaces 15 in the bottom mold sections 4 and 6 receive the inner portions of the lower reinforcing hoop 10.

With the central mold halves 1, 2 and intermediate mold sections 3, 4 and end mold sections 5, 6 in closed position, as shown in FIG. 6, it will be appreciated that the reinforcing hoops 9 and 10 are locked in place.

The pneumatic apparatus (not shown) is then activated to expel gas (generally air) under pressure from nozzles 8 into the interior of the soft thermoplastic material tube 11 to blow the tube walls outwardly against the interior wall of the mold central halves 1 and 2, the partially exposed inner surface of reinforcing hoops 9 and 10, and the inner surfaces of top and bottom mold sections 3, 4, 5, and 6.

Thereafter the thermoplastic material is allowed to cool and harden. The resulting, reinforced container 16 shown in the mold apparatus, in FIG. 7, has the reinforcing hoops 9 and 10 bonded to the upper and lower peripheral ends of the plastic container along part of the inner cylindrical surface of the hoops 9 and 10.

The ring shaped members 9 and 10 can be of any suitable rigid material. For instance, high density, high molecular weight polyethylene thermoplastic can be used and the shape can be made by injection molding. Or the rings can be formed from a metal such as steel by extrusion followed by machining. Any other suitable hard material can be used for the ring shaped members.

Figure 8:
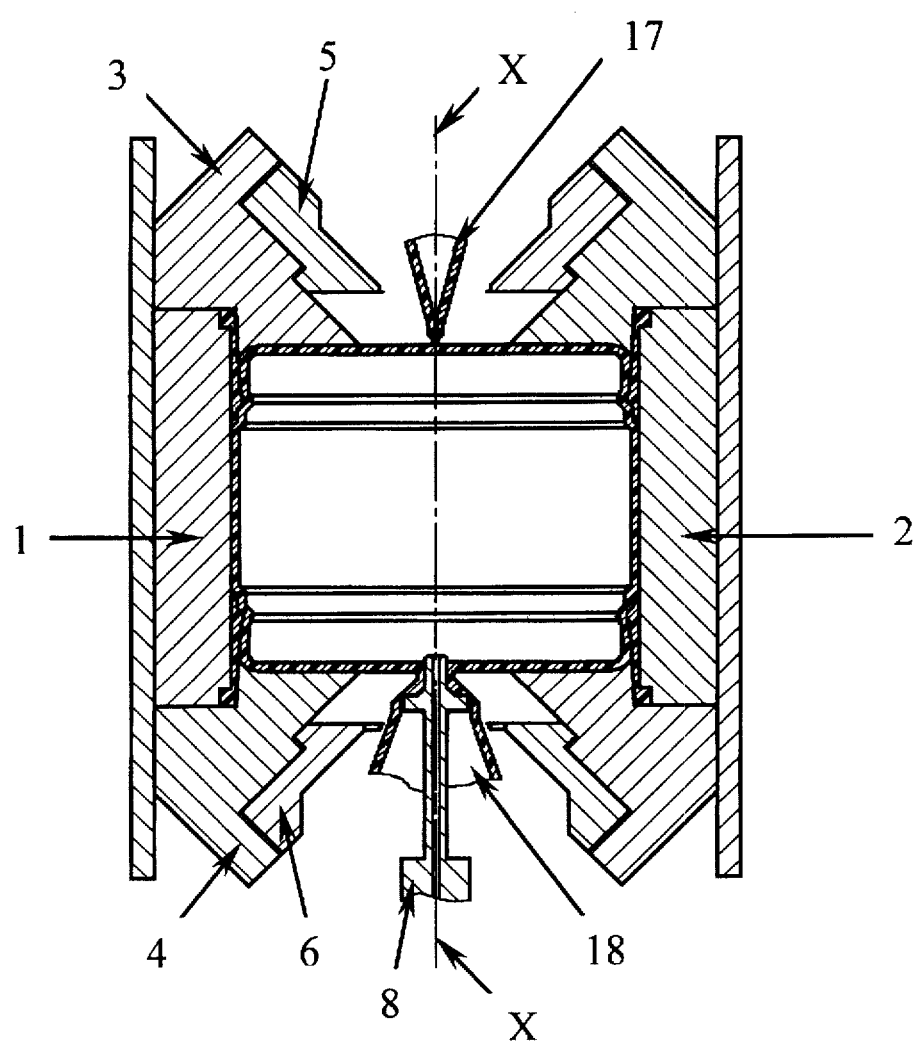
FIG. 8 is a cross-sectional view similar to FIGS. 1, 3–7, showing the end mold section extended to release the pinched-off thermoplastic material tube.

Thereafter the upper mold end section halves 5 slide on an incline apart from each other outwards the mold cavity, releasing the top pinched-off portion of the thermoplastic material tube 17 and the lower mold end section halves 6 slide on an incline apart from each other outwards the mold cavity, releasing the bottom pinched-off portion of the thermoplastic material tube 18 and the container openings, as shown in FIG. 8.

Figure 9:
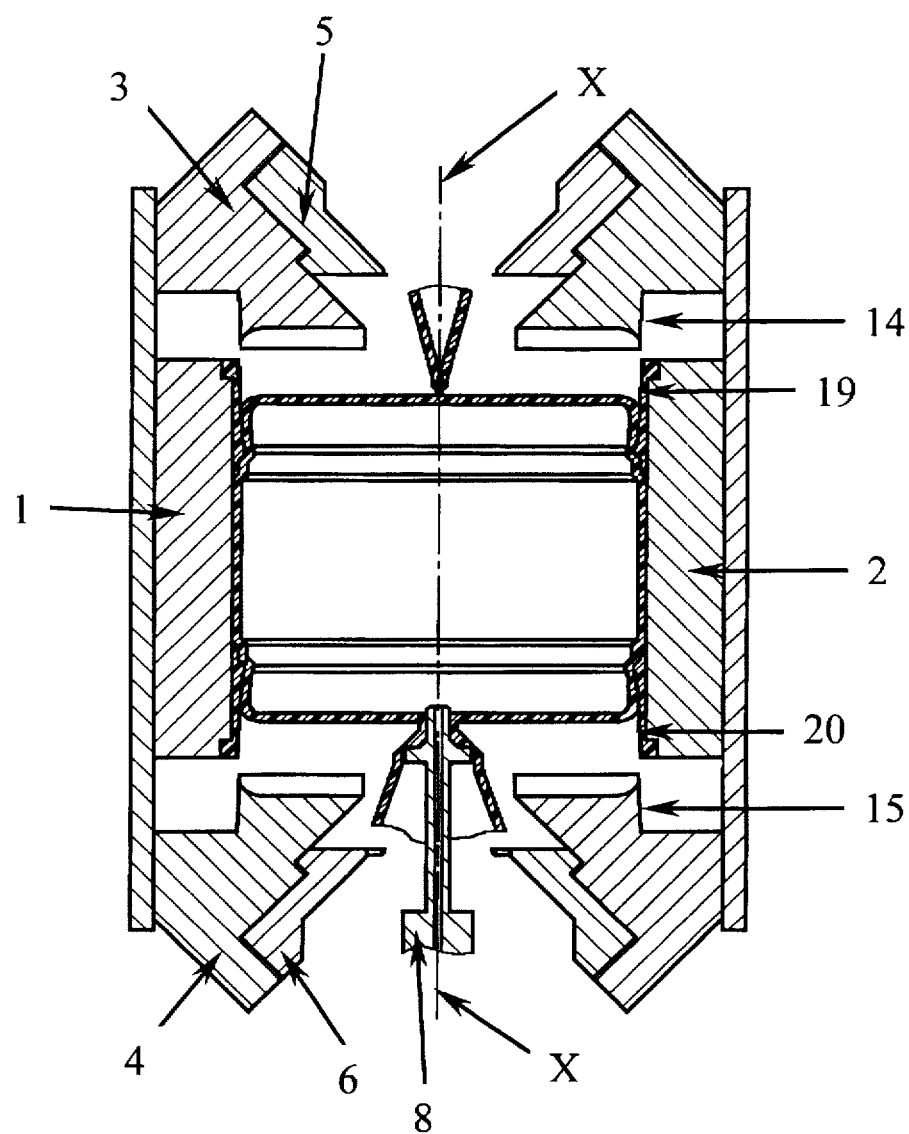
FIG. 9 is a cross-sectional view similar to FIGS. 1, 3–8, showing both intermediate and end mold sections in their extended positions.
Figure 10:
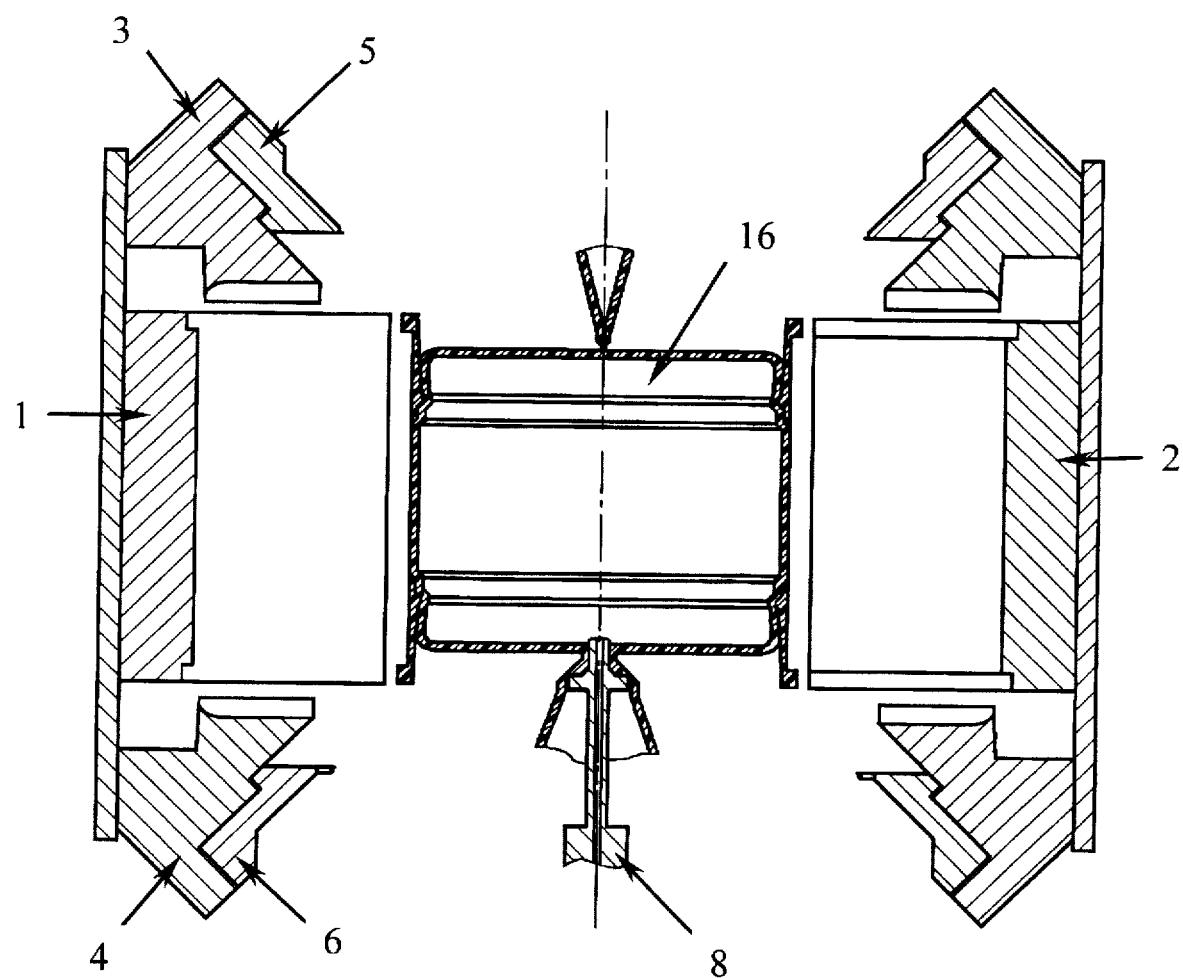
FIG. 10 is a cross-sectional view similar to FIGS. 1, 3–9, showing the mold in a fully extended position.

With mold sections 1–6 positioned as shown in FIG. 8, the top and bottom intermediate mold sections 3 and 4 are axially moved apart from one another (i.e. in a direction along the axis X—X) until extended position shown in FIG. 9, so that inner cylindrical surfaces 14 and 15 from mold intermediate sections 3 and 4 totally release the inner exposed surfaces 19 and 20 of reinforcing hoops 9 and 10 respectively, allowing central mold section halves 1 and 2 to extend, bringing the mold apparatus of the present invention to its fully extended position, as shown in FIG. 10.

The so made resulting container has a circumferential sidewall terminating in closed top and bottom, in which solid hoops are partially fused to the circumferential wall of the article and projecting axially above at least a portion of said top and bottom ends. Top and Bottom of the article are deeply recessed relative to respective top and bottom flange rings.

Another embodiment of the above described process using the mold apparatus described above is to produce a blow molded thermoplastic container having its opposite ends reinforced by compression molded reinforcing hoops on the circumferential wall of the container and projecting axially above at least a portion of said container ends. A tubular parison is introduced into the blow mold cavity. The central mold halves are closed while the intermediate mold sections are in their extended position. The upper parison end is closed by pinching and the lower parison end is closed by pinching against the blowing nozzle. A gas is introduced through the blowing nozzle into the interior of the tubular parison, while the intermediate mold sections are in their extended position to form and expand the parison into the shape of the inside surface of the mold and to form the open blow-molded chimes. The open blow-molded chimes are compressed into solid top and bottom ring shaped chimes integral with the container. The thermoplastic material of the container is then allowed to cool and harden, thereafter the inner pressure of the container is released. The demolding operation is then performed as explained in conjunction with FIG. 8–10.

While the improved molding process, molding apparatus and molded product of the present invention have been described above and shown in the drawings with reference to the preferred embodiments thereof, it is contemplated that numerous changes and modifications may be made to the process, apparatus and product of the preferred embodiments of the invention without departing from the spirit and scope thereof. Accordingly, it is intended that the scope of this patent be limited only by the scope of the appended claims.

What is claimed is:

1. A molding apparatus for blow molding thermoplastic containers having their opposite ends reinforced by reinforcing hoops partially fused to the circumferential wall of the container and projecting axially above at least a portion of said container ends, the apparatus comprising:

an extruder head for extruding a tubular parison;

a gas emitting nozzle for blow molding said tubular parison;

a mold divided into two central halves which are movable between an extended position wherein said mold central halves are spaced from one another and a closed position wherein said mold central halves engage one another to form a continuous circumferential interior surface;

each of said mold central halves having an upper end and a lower end;

each of said mold central halves having an upper groove in its interior surface adjacent to said upper end thereof and a lower groove in its interior surface adjacent to said lower end thereof;

said upper grooves in each of said mold central halves being aligned with one another so as to form a continuous upper groove when said mold central halves are in their closed position;

said lower grooves in each of said mold central halves being aligned with one another so as to form a continuous lower groove when said mold central halves are in their closed position;

said continuous upper and lower grooves, said upper groove adapted to receive and retain the outer peripheral edges of an upper reinforcing hoop and said lower groove adapted to receive and retain the outer peripheral edges of a lower reinforcing hoop;

an intermediate upper mold section half overlying said upper end of each of said mold central halves; and a lower intermediate mold section half overlying said lower end of each of said mold central halves;

said intermediate mold sections being movable with said mold central halves between their said extended position and their said closed position;

said upper and lower intermediate mold sections being movable towards one another when said central mold halves are in their said closed position to retain and engage the outer periphery and partially retain and engage the inner surface of said upper and lower reinforcing hoops in place;

an upper movable end mold section half sliding on an incline on said upper intermediate mold section; and a lower movable end mold section half sliding on an incline on said lower intermediate mold section;

said end mold sections being movable with said mold central halves between their said extended position and their said closed position;

said end mold sections being movable towards one another on an incline when said central and intermediate mold halves are in their said closed position to pinch or press the parison closed and totally close mold cavity;

said end mold sections being movable apart from each other on an incline when said central and intermediate mold halves are in their said closed position to release the pinched-off parison;

said intermediate mold sections being movable apart from each other when said central mold halves are in their said closed position and end mold section halves are in their said extended position to release internal surface of said reinforcing hoops;

said central mold section halves movable to said fully extended position to allow said blow molded container to be demolded.

2. An apparatus according to claim 1, wherein said central mold halves when in said extended position, are spaced sufficiently apart to permit the placement of reinforcing hoops coaxially aligned underneath said extruder head and horizontally aligned with said grooves on said central mold section halves whereby said reinforcing hoops will provide a totally open circular through passage through the open central portion of said hoops.

3. A molding apparatus according to claim 1, wherein said lower end mold section halves are provided with cutaway portions adapted to engage and enclose the end of the gas emitting nozzle when said end mold section halves are moved on an incline to their said closed position.

4. A molding apparatus according to claim 1, wherein the top and bottom surfaces defining the mold cavity have a circular geometry and wherein each of said mold central section halves are semi-cylindrical, each of said upper and lower grooves in the interior surface of each of said mold central section halves are semi-circular, and each of said intermediate mold section halves are semi-circular, and each of said mold end section halves complements the circular geometry of said mold cavity top and bottom surfaces.

5. A molding process for blow molding thermoplastic containers having their opposite ends reinforced by compression molded reinforcing hoops on the circumferential wall of the container and projecting axially above at least a portion of said container ends, the process comprising the steps of:

a) providing a blow mold divided into two central halves which are movable between an extended position wherein said mold central halves are spaced from one another and a closed position wherein said mold central halves engage one another to form a continuous circumferential interior surface;

each of said mold central halves having an upper end and a lower end;

each of said mold central halves having an upper groove in its interior surface adjacent to said upper end thereof and a lower groove in its interior surface adjacent to said lower end thereof.

said upper grooves in each of said mold central halves being aligned with one another so as to form a continuous upper groove when said mold central halves are in their closed position;

said lower grooves in each of said mold central halves being aligned with one another so as to form a continuous lower groove when said mold central halves are in their closed position;

said continuous upper and lower grooves form the outer peripheral side wall of the reinforcing hoops during the compression molding process;

an intermediate upper mold section half overlying said upper end of each of said mold central halves; and a lower intermediate mold section half overlying said lower end of each of said mold central halves;

said intermediate mold sections being movable with said mold central halves between their said extended position and their said closed position;

an upper movable end mold section half sliding on an incline on said upper intermediate mold section; and a lower movable end mold section half sliding on an incline on said lower intermediate mold section;

said end mold sections being movable with said intermediate mold halves between their said extended position and their said closed position;

said upper and lower intermediate mold sections being axially movable towards one another when said central mold halves are in their said closed position;

b) introducing a tubular parison into the blow mold cavity c) closing the central mold halves, while the intermediate mold sections are in their extended position and pinching the upper parison end closed and pinching the lower parison end closed against a blowing nozzle;

d) introducing a gas through the blowing nozzle into the interior of said tubular parison, while the intermediate mold sections are in their extended position to form and expand the parison into the shape of the inside surface of the mold and to form open blow-molded chimes;

e) compressing the open blow-molded chimes into solid top and bottom ring shaped chimes integral with the container;

f) allowing the thermoplastic material to cool and harden, thereafter releasing the inner pressure of the container;

g) performing a first demolding operation by sliding the end mold sections on an incline apart from each other outwards from the mold cavity, releasing the pinched-off portions of the parison;

h) performing a second demolding operation by axially moving the mold intermediate sections apart from one another to release the internal surface of the compression-molded bottom and top ring shaped chimes; and i) performing a third demolding operation by moving said central mold section halves to their fully extended position to allow said blow molded container to be removed from the mold.

6. A molding process for blow molding thermoplastic containers having their opposite ends reinforced by reinforcing hoops partially fused to the circumferential wall of the container and projecting axially above at least a portion of said container ends, the process comprising the steps of:

a) providing a blow mold divided into two central halves which are movable between an extended position wherein said mold central halves are spaced from one another and a closed position wherein said mold central halves engage one another to form a continuous circumferential interior surface;

each of said mold central halves having an upper end and a lower end;

each of said mold central halves having an upper groove in its interior surface adjacent to said upper end thereof and a lower groove in its interior surface adjacent to said lower end thereof;

said upper grooves in each of said mold central halves being aligned with one another so as to form a continuous upper groove when said mold central halves are in their closed position;

said lower grooves in each of said mold central halves being aligned with one another so as to form a continuous lower groove when said mold central halves are in their closed position;

said continuous upper and lower grooves adapted to receive and retain the outer peripheral edges of reinforcing hoops;

an upper intermediate mold section half overlying said upper end of each of said mold central halves; and a lower intermediate mold section half overlying said lower end of each of said mold central halves;

said intermediate mold sections being movable with said mold central halves between their said extended position and their said closed position;

an upper movable end mold section half sliding on an incline on said upper intermediate mold section; and a lower movable end mold section half sliding on an incline on said lower intermediate mold section;

said end mold sections being movable with said intermediate mold halves between their said extended position and their said closed position;

said upper and lower intermediate mold sections being axially movable towards one another when said central mold sections are in their said closed position and said end mold section are in their extended position;

b) providing reinforcing hoops positioned coaxially with mold centerline and aligned horizontally with respective upper and lower said grooves on said mold central halves;

c) introducing a tubular parison through the completely open circular surface of said reinforcing hoops into the open blow mold cavity;

d) closing the central mold halves, while the intermediate mold sections and the end mold sections are in their extended position, to receive and retain the reinforcing hoops;

e) closing intermediate mold sections to engage the reinforcing hoops;

f) sliding end mold sections on an incline towards the mold cavity into closed position to pinch the upper parison end closed and pinch the lower parison end closed against a blowing nozzle;

g) performing a blowing operation, by introducing a gas through the blowing nozzle into the interior of said tubular parison, while said mold sections are in their closed position to completely expand the parison against the inside surface of the mold and partially exposed inner surface of the reinforcing hoops;

h) allowing the thermoplastic material to cool and harden, thereafter releasing the inner pressure of the container;

i) performing a first demolding operation by sliding the end mold sections on an incline apart from each other outwards the mold cavity, releasing the pinched-off portions of the parison and the container openings, without deforming container top and bottom;

j) performing a second demolding operation by axially moving the mold intermediate sections apart from one another to release the internal surface of the bottom and top ring shaped members, which respectively extend axially past the lowest and uppermost portion of the hollow container; and k) performing a third demolding operation by moving said central mold section halves to their fully extended position to allow said blow molded container to be removed from the mold.

* * * * *